United States Patent
Cott et al.

(10) Patent No.: US 10,493,513 B2
(45) Date of Patent: Dec. 3, 2019

(54) METHOD FOR THE INDIVIDUALIZED ADAPTATION OF THE SHAPE OF COMPONENTS

(71) Applicant: ThyssenKrupp Steel Europe AG, Duisburg (DE)

(72) Inventors: Andreas Cott, Dortmund (DE); Erik Hilfrich, Düsseldorf (DE); Joseph Georg Kevenhörster, Bochum (DE); Oliver Mertens, Essen (DE); Lothar Patberg, Moers (DE); Marcus Rauhut, Mülheim a. d. Ruhr (DE); Ralf Stegmeyer, Medebach (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 160 days.

(21) Appl. No.: 15/124,028

(22) PCT Filed: Mar. 4, 2015

(86) PCT No.: PCT/EP2015/054510
§ 371 (c)(1),
(2) Date: Sep. 6, 2016

(87) PCT Pub. No.: WO2015/132300
PCT Pub. Date: Sep. 11, 2015

(65) Prior Publication Data
US 2017/0014891 A1    Jan. 19, 2017

(30) Foreign Application Priority Data
Mar. 6, 2014    (DE) .................. 10 2014 102 974

(51) Int. Cl.
*B21D 35/00* (2006.01)
*B21D 7/00* (2006.01)
(Continued)

(52) U.S. Cl.
CPC ............. *B21D 35/002* (2013.01); *B21D 7/00* (2013.01); *B21D 9/01* (2013.01); *B21D 22/00* (2013.01)

(58) Field of Classification Search
CPC ..... B21D 35/002; B21D 31/005; B21D 37/08
See application file for complete search history.

(56) References Cited

U.S. PATENT DOCUMENTS

| 406,332 A | * | 7/1889 | Bayles ................. B21C 37/101 138/152 |
| 1,840,512 A | * | 1/1932 | Kling .................... B21C 37/286 285/134.1 |

(Continued)

FOREIGN PATENT DOCUMENTS

| CN | 201818933 U | 5/2011 |
| CN | 203356238 U | 12/2013 |

(Continued)

OTHER PUBLICATIONS

English abstract of CN203356238U.
(Continued)

*Primary Examiner* — Gregory D Swiatocha
(74) *Attorney, Agent, or Firm* — RMCK Law Group PLC

(57) ABSTRACT

A method for the individualized adaptation of the shape of components includes providing a basic material for producing the components. Next at least one unifying production method is selected. The components are then produced with a geometrically identical base shape by the unifying production method. Then at least one individualizing production method is selected. Then the shape of the components is adapted to at least two different final shapes by the individualizing production method that is different from the unifying production method. The final shape of each component differs from its basic shape.

20 Claims, 3 Drawing Sheets

(51) Int. Cl.
  *B21D 9/01*   (2006.01)
  *B21D 22/00*  (2006.01)

(56) References Cited

U.S. PATENT DOCUMENTS

| | | | | |
|---|---|---|---|---|
| 2,066,227 | A * | 12/1936 | Reukauf, Jr. | E04F 10/02 |
| | | | | 160/81 |
| 2,329,938 | A * | 9/1943 | Ortiz | B23K 11/002 |
| | | | | 219/67 |
| 2,858,115 | A * | 10/1958 | Stebbins | F28F 1/10 |
| | | | | 138/159 |
| 3,083,793 | A * | 4/1963 | Brout | E04B 1/19 |
| | | | | 52/222 |
| 3,206,836 | A * | 9/1965 | Schlussler | B21C 37/29 |
| | | | | 138/114 |
| 3,504,520 | A * | 4/1970 | Matson | B21D 9/03 |
| | | | | 72/466 |
| 3,833,985 | A * | 9/1974 | Curry | B21C 37/28 |
| | | | | 29/890.149 |
| 5,176,512 | A * | 1/1993 | Evens | F23D 14/045 |
| | | | | 126/99 R |
| 5,267,610 | A * | 12/1993 | Culbert | B21D 53/085 |
| | | | | 165/151 |
| 5,327,764 | A | 7/1994 | Weykamp et al. | |
| 5,502,997 | A * | 4/1996 | Boettger | B21D 7/022 |
| | | | | 72/296 |
| 5,697,155 | A | 12/1997 | Bloecker et al. | |
| 5,778,999 | A * | 7/1998 | Nealeigh | E04G 21/28 |
| | | | | 182/129 |
| 5,873,409 | A | 2/1999 | Letrange et al. | |
| 6,672,375 | B1 * | 1/2004 | Shippy | F24F 1/0059 |
| | | | | 165/122 |
| 6,812,439 | B1 * | 11/2004 | Durand | B23K 9/08 |
| | | | | 219/617 |
| 8,863,565 | B2 * | 10/2014 | Tomizawa | B21D 7/08 |
| | | | | 72/128 |
| 2004/0206566 | A1 * | 10/2004 | Katsura | B62K 11/04 |
| | | | | 180/219 |
| 2008/0275718 | A1 * | 11/2008 | Chen | A47C 1/124 |
| | | | | 705/1.1 |
| 2008/0314189 | A1 * | 12/2008 | Lutz | B21C 37/0803 |
| | | | | 74/492 |
| 2010/0270013 | A1 * | 10/2010 | Lee | B21D 17/00 |
| | | | | 165/182 |
| 2015/0135795 | A1 * | 5/2015 | Ishimori | B21D 5/015 |
| | | | | 72/339 |

FOREIGN PATENT DOCUMENTS

| | | |
|---|---|---|
| DE | 296865 A | 12/1991 |
| DE | 9417314 U1 | 1/1995 |
| DE | 19653509 A1 | 6/1998 |
| DE | 102009025985 A | 12/2010 |
| DE | 102010025593 A1 | 12/2011 |
| DE | 102011008997 A | 4/2012 |
| EP | 0496181 A | 7/1992 |
| EP | 1172281 A1 | 1/2002 |
| JP | 2000153313 A | 6/2000 |
| JP | 2000153380 A | 6/2000 |
| KR | 20100127401 A | 12/2010 |
| WO | 2004065052 A | 8/2004 |
| WO | 2005/051562 A1 | 6/2005 |
| WO | 2009078158 A1 | 6/2009 |

OTHER PUBLICATIONS

English abstract of DE102011008997A.
English abstract of CN201818933U.
German Language International Search Report (ISR) for PCT/EP2015/054510, dated May 4, 2015.
English translation of International Search Report for PCT/EP2015/054510, dated May 4, 2015.
German Language Written Opinion of the International Search Authority (ISA) for PCT/EP2015/054510 (no English translation yet made available).
German Language International Preliminary Report on Patentability Chapter II (IPRP) for PCT/EP2015/054510.
English translation of the International Preliminary Report on Patentability Chapter II (IPRP) for PCT/EP2015/054510.
English translation of the abstract of DE 19653509 A1.
English translation of the abstract of DE102010025593 A1.
English translation of the abstract of KR 20100127401 A.
English translation of the abstract of EP 1172281 A1.
English Translation of Japanese Office Action for JP Application No. 2016-555292 dated Feb. 5, 2019.

* cited by examiner

METHOD FOR THE INDIVIDUALIZED ADAPTATION OF THE SHAPE OF COMPONENTS

CROSS REFERENCE TO RELATED APPLICATIONS

This application is a U.S. National Stage Entry of International Patent Application Serial Number PCT/EP2015/054510, filed Mar. 4, 2015, which claims priority to German Patent Application No. DE 102014102974.7 filed Mar. 6, 2014, the entire contents of both of which are incorporated herein by reference.

FIELD

The invention relates to a method for the individualized adaptation of the shape of components.

BACKGROUND

There are always great differences between the individual manufacturing of different components and the series or mass manufacturing of identical components in respect of the plants required, the number of variants which can be produced and the (piece) costs associated therewith. Individual manufacturing makes it possible to produce small piece numbers of components with tools or plants more likely requiring low capital costs. The production methods used for this purpose are customarily highly flexible and permit a rapid conversion to the production of components of varying size and/or shape. Tools or plants which are suitable for the series or mass manufacturing generally do not have this flexibility. In addition, they more likely require high capital costs. In return, they permit the rapid production of large quantities of identically designed components.

Individual production methods and production methods for mass manufacturing can be difficult to combine with one another because of the described differences. This conflict of objectives frequently can only be resolved in that a decision has to be made for one of these two types of production. The decision often depends on the previously described requirements, such as piece numbers and number of variants to be produced. Particular challenges arise in the production of components which, although they are intended to be produced in large piece numbers, are nevertheless intended to be produced in different variants or with different shapes.

Solutions which combine the principles of mass manufacturing and individual manufacturing with one another are known from the prior art. These solutions are, for example, modular designs or platform designs. However, a disadvantage of these known solutions consists in that there are only a few degrees of freedom in individual design parameters. This has the consequence that only a small degree of individualization can be achieved.

Accordingly, there is a need for an improved method of manufacturing components, in such a manner that components having differing geometry can also be produced cost-effectively in large piece numbers.

BRIEF DESCRIPTION OF THE DRAWINGS

The present disclosure is described in detail below with reference to the attached drawing figures, wherein.

DETAILED DESCRIPTION

Figure 1:
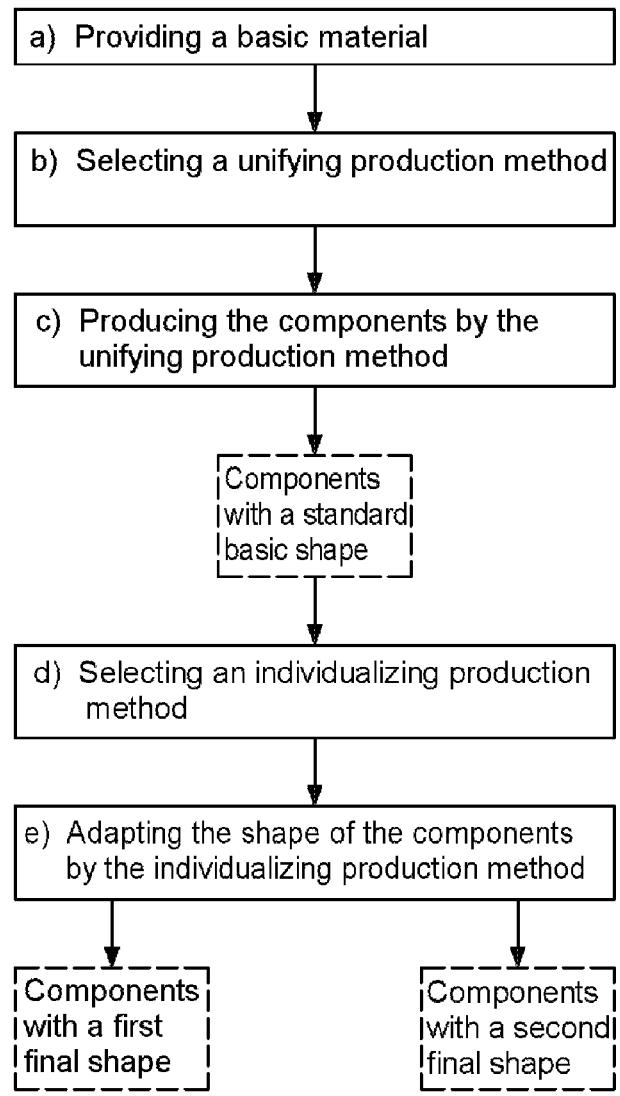
FIG. 1 is a schematic illustration of an embodiment of a method for the individualized adaptation of the shape of components, of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The method according to the invention serves for the individualized adaptation of the shape of components and comprises the following steps: a) providing a basic material for producing the components, b) selecting at least one unifying production method, c) producing the components with a geometrically identical basic shape by the unifying production method, d) selecting at least one individualizing production method, and e) adapting the shape of the components to at least two different final shapes by the individualizing production method. In the case of the method according to the invention, the unifying production method differs from the individualizing production method. In addition, in the case of the method according to the invention, the final shape of each component differs from its basic shape.

Step a) serves the purpose of selecting a suitable basic material for the production of the components. In step b), at least one suitable "unifying" production method is selected, with which components with a geometrically identical basic shape are produced in step c). A unifying production method is understood as meaning a production method which is particularly suitable for producing components with an identical, standard shape. The particular suitability can arise, for example, from rigid, non-changeable tools, such as, for example, the tools of a press ("geometry-related tool"). Methods of this type are therefore particularly suitable for the series or mass manufacturing of identically designed components.

Following this, in step d), at least one "individualizing" production method is selected, with which, finally, in step e), the shape of the components is adapted to at least two different final shapes. An individualizing production method is understood as meaning a production method which is particularly suitable for producing components with different final shapes. The particular suitability can arise, for example, by the fact that the shape and/or moveability of the tool used can make it possible to process and produce a multiplicity of different component shapes ("(final) geometrically open tool"). Methods of this type are therefore particularly suitable for the individual manufacturing of components with different geometry.

The method according to the invention therefore constitutes a combination of production methods which are suitable for series or mass manufacturing and of production methods which are suitable for individual manufacturing. All in all, therefore, a "hybrid" production method for the individualized mass manufacturing is involved. The described method affords particular advantages in the production of components with a similar—although not identical—geometry. Owing to the similarity of the shape, in the case of components of this type, the second, individualizing production step can turn out particularly simply and therefore cost-effectively. An example of components of this type are junction elements for the connection of tubes for supporting frameworks, such as scaffolding or bridges. A further possible field of use of the method resides within the scope of platform strategies in the automobile industry. In addition, the method can be used for the ergonomic adaptation of products to body contours (for example seat shelves or items of furniture). Finally, the method can serve to fulfil design requests.

According to a refinement of the method, it is provided that the basic material for producing the components is metal sheet, in particular steel sheet or aluminium sheet. Metal sheets can be formed particularly readily and therefore permit a variable shaping of the components to be produced.

It is provided, in a further development of the method, that at least two different unifying production methods are selected and used in step b) and c). Alternatively or additionally, it can be provided that at least two different individualizing production methods are selected and used in step d) and e). Even particularly complex component geometries can be achieved by the use of a plurality of unifying production methods. A unifying production method chain may comprise, for example, the steps of deep drawing and cutting. Owing to the flexibility of the individualizing production methods, components with different final shapes can also be achieved with only one of said methods. Nevertheless, the selection of two or more individualizing production methods has the advantage that the individualizing production method can be particularly readily adapted to the composition and geometry of the final shape of the components. In addition, the number of variants which can be produced as a whole is generally increased by a plurality of different individualizing production methods. An individualizing production method chain may comprise, for example, the steps of bending and 3D cutting.

In a further refinement of the invention, it is provided that the components are junction elements of a supporting structure, wherein the junction elements comprise at least two connecting points. Junction elements of a supporting structure can be divided into certain types (for example "corner piece", "T piece", etc.) and only slightly differ from one another within a type. The geometrical difference may be required, for example, because of different supporting widths, pitch angles, inclinations or radii of the supporting framework. The described method makes it possible to produce a basic shape of each type at reasonable cost in high piece numbers by means of mass manufacturing and to adapt the basic shape according to demand to the respective requirements by individualizing reworking. It therefore affords particular advantages in the case of the production of components with similar geometry, such as, for example, junction elements of a supporting structure. The connecting points serve for the connection of tubes or rods; they are therefore preferably of round design. Alternatively, the connecting points may have a defined profile geometry. The profile geometry is preferably produced by the at least one individualizing production method. By means of individual profile geometries, it is possible for only certain profile ends to be connected to the junction components, and therefore erroneous connections are eliminated ("lock and key principle" or "Poka Yoke principle").

With regard to this refinement, it is furthermore proposed that the shape and/or the orientation of at least one connecting point of the junction elements is adapted in step e). By adaptation of the shape of the connecting points, tubes or rods of different shape and size can be connected to the junction elements. By contrast, a change in the orientation of the connecting points influences the direction of the tubes or rods connected at said connecting point, which permits a variable design of the supporting framework. The shape and/or orientation of at least two or of all connecting points is preferably adapted.

It is provided in a further teaching of the invention that punching, pressing or hydroforming is used as the unifying production method. These production methods are particularly suitable for series or mass manufacturing. Although they require quite high capital costs for the production of geometry-related tools (for example punching or pressing moulds), they nevertheless permit inexpensive production of identically shaped components in very high piece numbers.

According to a further development of the invention, it is proposed that a geometry-open forming method is used as the individualizing production method. Profile bending, in particular profile bending with an articulated mandrel, incremental forming and forming with an elastic die are particularly suitable. These types of forming methods are particularly suitable for individualizing individual manufacturing. The suitability resides in particular in the use of moveable or flexible or elastic tools.

The profile bending with an articulated mandrel or with other free-shape bending devices can be used particularly advantageously for producing hollow components since the moveable articulated mandrel can be inserted into the hollow profile and can bend or deform the component from the inside. Methods for the plastic deformation of components on a mandrel are known as such, for example from DE 10 2009 025 985 A1 or DD 296 865 A5.

During incremental forming, a pressure mandrel forms the clamped and heated component by moving over predetermined paths. The pressure mandrel preferably rotates as it moves over the component surface. The pressure mandrel is frequently controlled by complex machine tools or robots; incremental forming is therefore sometimes also referred to as "roboforming". Incremental forming can be used particularly advantageously for processing or forming flat components, such as metal sheets, since ready accessibility of the component surface for the pressure mandrel is ensured there.

The forming with an elastic die takes place by means of two interacting tools of different hardness, wherein the tool with the greater hardness (for example a metal punch) "presses" the workpiece to be processed into the elastically yielding tool with the lesser hardness (for example an underlying surface or "bed" composed of an elastomer). During this operation, the softer tool is deformed and adapted to the shape of the harder tool, and therefore the workpiece which is pressed together between the tools is likewise substantially adapted to the shape of the harder tool. The forming with an elastic die can also be used particularly advantageously for processing or forming flat components, such as metal sheets, since ready accessibility of the component surface for the two tools is ensured there.

In a further refinement of the invention, it is proposed to use additive manufacturing methods, in particular build-up welding, as an individualizing production method. These methods are also particularly suitable for the individualizing individual manufacturing since the (welding) tools used can frequently be moved in a particularly variable manner and can therefore produce even particularly complex geometries.

An advantage of a building-up, additive method resides in the fact that, in addition to the pure shaping, additional functions can also be fulfilled. For example, by methods of this type, changes in the profile cross section can be achieved (for example a means for securing against rotation) or stops can be formed. Build-up welding methods are known as such, for example, from EP 0 496 181 A1 or WO 2004/065052 A1.

Finally, it is provided, according to a further development of the invention, that steps c) and e) are carried out together in the same plant. Step c) relates to the at least one unifying production method, step e), by contrast, relates to the at least one individualizing production method. By the unifying and the individualizing production methods being carried out in the same—combined—plant, production can be achieved in a particularly compact space.

The present disclosure is explained in further detail below with reference to the attached drawing figures illustrating an exemplary embodiment.

FIG. 1 shows a schematic illustration of a first refinement of a method according to the invention. In step a), a basic material is provided for producing components. Said basic material can be metal sheets, in particular steel sheets or aluminium sheets. Step b) relates to the selection of a unifying production method, i.e. a production method which produces components with an identical, standard shape. In step c), the components are processed or produced with the previously selected unifying production method. The unifying production method from steps b) and c) is, for example, punching, pressing or hydroforming. The results of method steps a) to c) are components with an identical, standard shape which—since it does not yet correspond to the final shape—is also referred to as the "basic shape".

In the case of the refinement of the method that is illustrated in FIG. 1, an individualizing production method, i.e. a production method which produces components with different final shapes, is selected in d). Step e) finally relates to the adaptation of the shape of the components by the previously selected individualizing production method. The individualizing production method from steps d) and e) is, for example, a forming process, such as profile bending, in particular profile bending with an articulated mandrel, incremental forming or forming with an elastic die. Alternatively or additionally, the individualizing production method from steps d) and e) can be an additive manufacturing method, in particular build-up welding, for example laser build-up welding. The result of method steps d) and e) is components with different final shapes.

In the case of the refinement of the method that is illustrated in FIG. 1, only one individualizing production method is selected and used; with this production method, individual, different final shapes of the components are nevertheless achieved. In the case of the refinement of the method that is illustrated in FIG. 1 and is to this extent preferred, components with a total of two different final shapes are produced in step e) by the individualizing production method. Alternatively thereto, three or more different final shapes can also be achieved in step e) by the individualizing production method.

Figure 2:
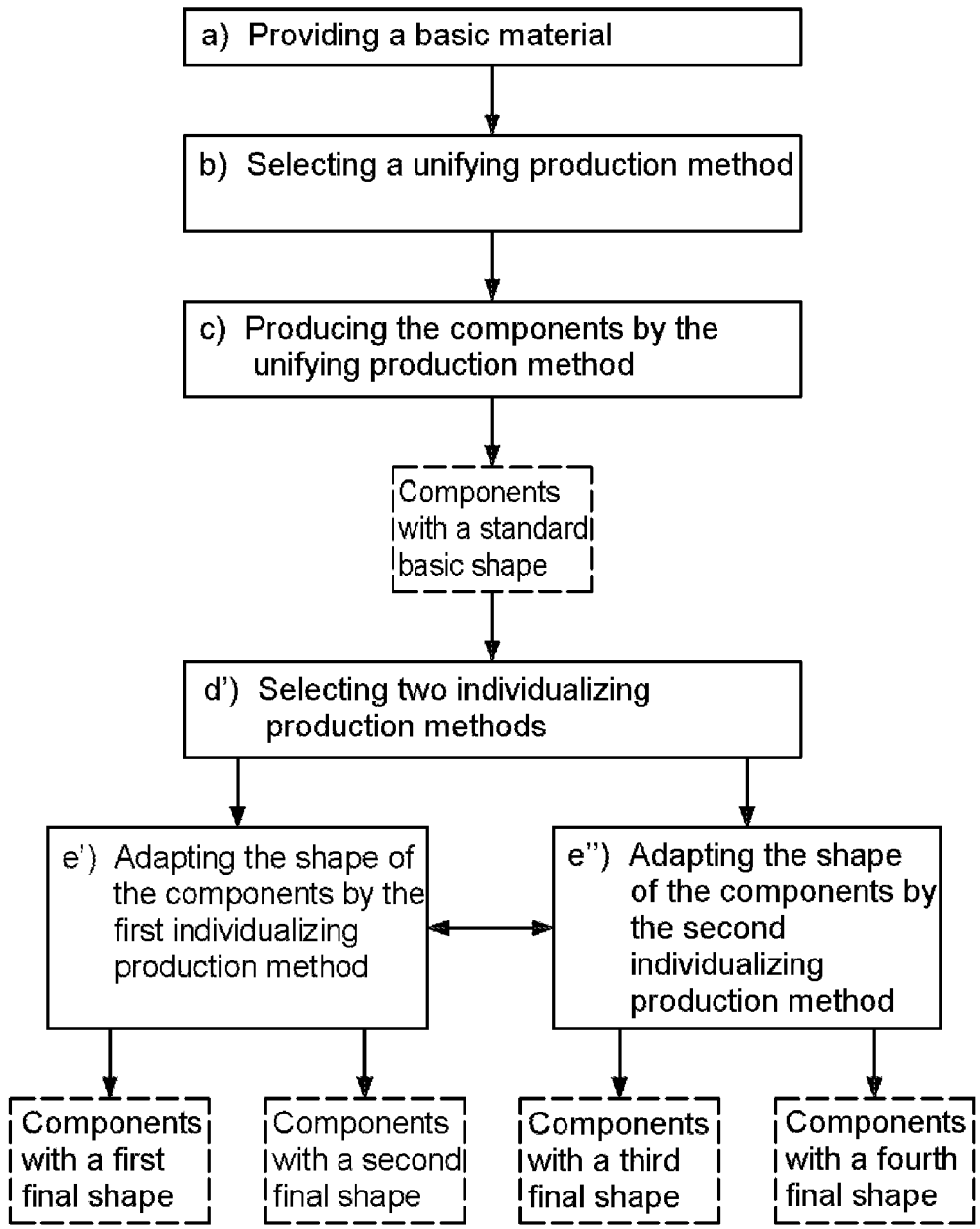
FIG. 2 is a schematic illustration of an alternate embodiment of a method for the individualized adaptation of the shape of components, of the present disclosure.

FIG. 2 shows a schematic illustration of a second refinement of a method according to the invention. The steps of the method that are already described in conjunction with FIG. 1 are provided with corresponding reference signs in FIG. 2. The method steps a) to c) correspond to the first refinement of the method that is illustrated in FIG. 1, and therefore components having an identical, standard (basic) shape are initially also obtained this time. However, the further steps of the second refinement of the method that is shown in FIG. 2 differ from the first refinement of the method that is illustrated in FIG. 1. The first difference resides in the fact that, in step d'), not just one, but two different individualizing production methods are selected. However, the group of suitable production methods is the same as already described previously. A further difference resides in the fact that, in steps e') and e"), the shapes of the components are adapted not just by one, but by two different, previously selected individualizing production methods. The result of method steps d'), e') and e") is components with different final shapes:

with each of the production methods selected in step d'), individual, different final shapes of the components are achieved. In the case of the refinement of the method that is illustrated in FIG. 2 and is to this extent preferred, components with two different final shapes are produced by each of the individualizing production methods in steps e') and e"), and therefore a total of four different final shapes are achieved. Alternatively thereto, three or more different final shapes can also be produced by each of the individualizing production methods in steps e') and e"), and therefore a total of six or more final shapes are achieved. The components can also be processed successively by the two steps e') and e"), which is illustrated in FIG. 2 by a connecting arrow between two said steps.

Figure 3A:
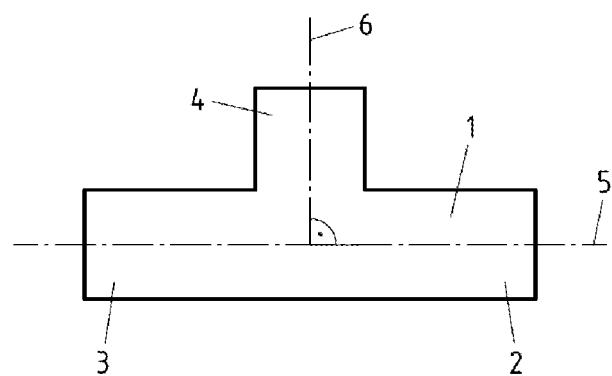
FIG. 3a is an illustration of an embodiment of an individual step in the method for production of a junction element of a supporting structure, as disclosed herein.
Figure 3B:
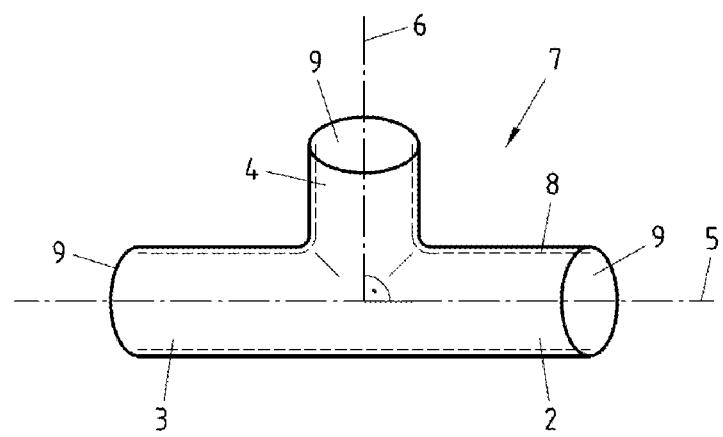
FIG. 3b is an illustration of an embodiment of an additional step in the method for production of a junction element of a supporting structure, as disclosed herein.
Figure 3C:
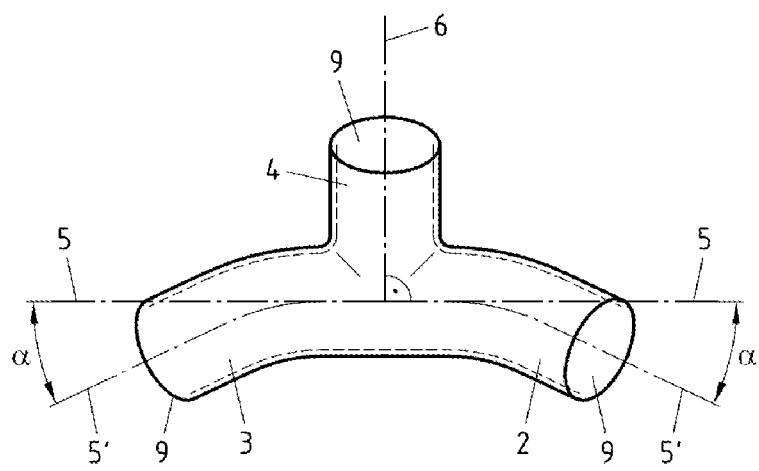
FIG. 3c is an illustration of an embodiment of an additional step in the method for production of a junction element of a supporting structure, as disclosed herein.

FIG. 3a to FIG. 3c illustrate different steps for producing a junction element 7 of a supporting structure by a method according to the invention. FIG. 3a shows a basic material 1 which is a metal sheet which is cut to size or is punched out. The basic material 1 is of T-shape design and therefore has three ends 2, 3, 4. Two ends 2, 3 are arranged lying opposite each other and lie on a common longitudinal axis 5. The third end 4 lies on a transverse axis 6 at right angles to the longitudinal axis 5. The basic material 1 from FIG. 3a is formed by a pressing or deep-drawing operation, and therefore a half shell (not illustrated in FIG. 3a) is produced. A plurality of said half shells are subsequently connected to one another by a joining operation, for example a welding method. By joining the half shells together, a junction element 7 of a supporting structure is produced, the junction element being illustrated by way of example in FIG. 3b. Weld seams 8 can be seen at the joining points of the junction element 7. The junction element 7 illustrated in FIG. 3b has three connecting points 9 which in this case are round openings for the connection of tubes (not illustrated). The connecting points 9 are produced in the region of the ends 2, 3, 4 and make it possible for a plurality of tubes to be able to be joined together by the junction elements 7 to form a supporting structure, for example scaffolding. Up to the stage illustrated in FIG. 3b, use has exclusively been made of unifying production methods, and therefore all of the junction elements 7 have a standard basic shape shown in FIG. 3b.

In order to be transferred from the standard basic shape (FIG. 3b) into the individualized final shape (FIG. 3c), the junction elements 7 are processed by an individualizing production method. For this purpose, because of the hollow shape of the junction elements 7 that is illustrated in FIG. 3b and FIG. 3c, in particular profile bending with an articulated mandrel is appropriate. To this end, a mandrel (not illustrated in FIG. 3b and FIG. 3c) is inserted into the two connecting points 9 lying on the longitudinal axis 5 and is bent downward, wherein plastic deformation of the junction element 7 takes place in the region of the two opposite ends 2, 3 of the junction element 7. This has the consequence that the two opposite connecting points 9 lie on a longitudinal axis 5' which is inclined by an angle α in relation to the original longitudinal axis 5. In the situation illustrated in FIG. 3c, the angle α is identical on both sides; alternatively thereto, different angles of inclination a can also be set. The angle α is preferably within the range of between 5° and 25°. By contrast, in the region of the third, "upper" connecting point 9, the junction element 7 has not been deformed, and therefore the upper connecting point 9 continues to be arranged on the transverse axis 6. After carrying out the method, the rigidity of the junction elements 7 can be further increased, for example by the introduction of bulkhead plates.

By means of the use of an individualizing production method, smaller quantities of junction elements 7 with a different final shape (FIG. 3c) can be produced according to demand from a large quantity of series or mass manufactured junction elements 7 with an identical basic shape (FIG. 3b). The different final shapes can arise, for example, because of an individual setting of different angles of inclination α. The concept according to the invention is not restricted to junction elements 7 of a supporting structure, but rather can be transferred to the production of other components.

What is claimed is:

1. A method for individually shaping components of a supporting structure, comprising:
   a) providing a metal sheet as a basic material for producing the components;
   b) producing the components by a unifying production method comprising the steps of pressing and immediately following the pressing, a joining operation, such that the components have a geometrically identical basic shape, wherein the pressing includes producing half shells; and after the half shells are produced, connecting the half shells to each other by the joining operation to create a plurality of junction elements having the geometrically identical basic shape including first and second ends arranged opposite each other on a common longitudinal axis and a third end arranged on a transverse axis relative to the longitudinal axis; and
   c) adapting the shape of the junction elements by at least one individualizing production method selected from the group consisting of profile bending with an articulated mandrel, incremental forming, forming with an elastic die, or additive manufacturing, such that the junction elements are transferred from the geometrically identical basic shape into components having one of at least two different final shapes, wherein the junction elements are part of the supporting structure, the junction elements having three connecting points produced from the first, second and third end, respectively, wherein the unifying production method differs from the individualizing production method, and wherein the final shape of each component differs from its basic shape.

2. The method of claim 1, wherein the basic material for producing the components is one of sheet steel or aluminum sheet.

3. The method of claim 1, wherein said step of adapting the shape of the junction elements comprises adapting the shape of the junction elements by at least two different individualizing production methods of the group consisting of profile bending, incremental forming, forming with an elastic die, or additive manufacturing.

4. The method of claim 3, wherein said adapting step includes adapting at least one of the shape or the orientation of at least one connecting point of the junction elements.

5. The method of claim 1, wherein in said adapting step, the individualizing production method of profile bending is performed as profile bending with an articulated mandrel.

6. The method of claim 1, further comprising the step of build-up welding the components as the additive manufacturing method.

7. The method of claim 1, wherein said producing and adapting steps are performed together in one plant.

8. The method of claim 1 wherein at least one connecting point of the connecting points of a first junction element is deformed to have a first angle of inclination relative to the longitudinal axis and at least one connecting point of the connecting points of a second junction element is deformed to have a second angle of inclination relative to the longitudinal axis, the first and second angles of inclination being distinct.

9. The method of claim 1 wherein the junction elements are for a connection of tubes for supporting frameworks.

10. The method of claim 9 wherein the frameworks are one of scaffolding or bridges.

11. The method of claim 1 wherein the junction elements are used in an automotive platform.

12. The method of claim 1 wherein the junction elements are used in ergonomic adaptation of products to body contours.

13. A method for individually shaping components of a supporting structure, comprising:
   a) providing a metal sheet as a basic material for producing the components;
   b) producing the components by a unifying production method comprising the steps of pressing and immediately following the pressing, a joining operation, such that the components have a geometrically identical basic shape, wherein the pressing includes producing half shells; and after the half shells are produced, connecting the half shells to each other by the joining operation to create a plurality of junction elements having the geometrically identical basic shape including first and second open ends arranged opposite each other on a common longitudinal axis and a third open end arranged on a transverse axis relative to the longitudinal axis;
   c) selecting a first junction element from the plurality of junction elements;
   d) inserting an articulated mandrel into the first and second open ends of the first junction element;
   e) bending the first and second open ends of the first junction element downward and away from the third open end with the articulated mandrel thereby adapting the shape of the first junction element by profile bending such that the first junction element is transferred from the geometrically identical basic shape into a component having a first shape of at least two different final shapes;
   f) selecting a second junction element from the plurality of junction elements;
   g) inserting the articulated mandrel into the first and second open ends of the second junction element; and
   h) bending the first and second open ends of the second junction element downward and away from the third open end with the articulated mandrel thereby adapting the shape of the second junction element by profile bending such that the second junction element is transferred from the geometrically identical basic shape into a component having a second shape of at least two different final shapes, the second shape distinct from the first shape;
wherein the junction elements are part of the supporting structure, the junction elements having three connecting points produced from the first, second and third open end, respectively, wherein the unifying production method differs from the individualizing production method, and wherein the final shape of each component differs from its basic shape.

14. The method of claim 13 wherein the first open end of the first junction element is bent downward to a first angle and the second open end of the first junction element is bent downward to a second angle.

15. The method of claim 14 wherein the first and second angles are equal.

16. The method of claim 14 wherein the first and second angles are distinct.

17. The method of claim 14 wherein the first open end of the second junction element is bent downward to a first angle and the second open end of the second junction element is bent downward to a second angle, wherein at least one of the first and second angles of the first and second open ends of the first junction element is distinct from a corresponding one of the first and second angles of the first and second open ends of the second junction element.

18. A method for individually shaping components of a supporting structure, comprising:
   a) providing a metal sheet as a basic material for producing the components;
   b) producing the components by a unifying production method comprising the steps of pressing and immediately following the pressing, a joining operation, such that the components have a geometrically identical basic shape, wherein the pressing includes producing half shells; and after the half shells are produced, connecting the half shells to each other by the joining operation to create a plurality of junction elements having the geometrically identical basic shape including first and second open ends arranged opposite each other on a common longitudinal axis and a third open end arranged on a transverse axis relative to the longitudinal axis;
   c) selecting a first junction element from the plurality of junction elements;
   d) selecting a first individualizing production method from the group consisting of profile bending, incremental forming, forming with an elastic die, or additive manufacturing;
   e) adapting the shape of the first junction element by the first selected individualizing production method whereby the first junction element is transferred from the geometrically identical basic shape into a component having a first shape of at least two different final shapes;
   f) selecting a second individualizing production method from the group consisting of profile bending, incremental forming, forming with an elastic die, or additive manufacturing, the second individualizing production method being distinct from the first individualizing production method; and
   g) adapting the shape of the second junction element by the second selected individualizing production method whereby the first junction element is transferred from the geometrically identical basic shape into a component having a second shape, distinct from the first shape, of the at least two different final shapes.

19. The method of claim 18 wherein the junction elements are part of the supporting structure, the junction elements having three connecting points produced from the first, second and third open end, respectively, wherein the unifying production method differs from the individualizing production method, and wherein the final shape of each component differs from its basic shape.

20. The method of claim 19 wherein the first individualizing production method comprises profile bending.

* * * * *